United States Patent

[11] 3,577,788

| [72] | Inventor | Friedrich J. Tischer<br>2300-M4-Avent Ferry Road, Raleigh, N.C. 27606 |
|---|---|---|
| [21] | Appl. No. | 791,599 |
| [22] | Filed | Jan. 16, 1969 |
| [45] | Patented | May 4, 1971 |

[54] SPHERICAL AIR BEARING GYRO
10 Claims, 5 Drawing Figs.

[52] U.S. Cl. .................................................. 74/5.6,
74/5, 308/9
[51] Int. Cl. .................................................. G01c 19/12,
G01c 19/28
[50] Field of Search .................................. 74/5, 5.6,
5.7, 5.43; 308/9,(N)

[56] References Cited
UNITED STATES PATENTS

| 3,320,816 | 5/1967 | Johnston | 74/5.7X |
| 3,451,289 | 6/1969 | Edmonds et al. | 74/5.6X |
| 3,485,106 | 12/1969 | Gerwin | 74/5.6 |
| 1,419,010 | 6/1922 | Brown | 74/(5.6UX) |
| 2,237,077 | 4/1941 | Lauck | 74/(5.6UX) |
| 2,729,106 | 1/1956 | Mathiesen | 74/5.7 |
| 3,187,588 | 6/1965 | Parker | 74/5.7X |
| 3,276,270 | 10/1966 | Speen | 74/5.7X |
| 3,416,378 | 12/1968 | Evens et al. | 74/5.6 |
| 3,435,688 | 4/1969 | Ogren | 74/5.43X |

*Primary Examiner*—Manuel A. Antonakas
*Attorneys*—Harry M. Saragovitz, Edward J. Kelly, Herbert Berl and James T. Deaton

ABSTRACT: A spherical air bearing gyro that is pneumatically actuated and supported as a two-degree-of-freedom gyro. One specie of the invention has a bolometer circuit that is mounted relative to the gyro housing and responds to air blown thereover from an exhaust of the pneumatically actuated gyro. The bolometer circuit senses deviations of the gyro rotor and adjusts the gyro housing relative to the gyro rotor to correct deviations.

Patented May 4, 1971

Friedrich J. Tischer,
INVENTOR.

Patented May 4, 1971

Friedrich J. Tischer,
INVENTOR.

BY Harry M. Saragovitz
Edward J. Kelly
Herbert Berl
James T. Deaton

SPHERICAL AIR BEARING GYRO

The invention described herein may be manufactured and used by or for the Government for governmental purposes without the payment of any royalty thereon.

This invention relates to an air bearing-supported gyro with electrical controls.

In the missile industry, there is a constant need for gyro devices that are simple, accurate, reliable and relatively cheap to build.

Therefore, it is an object of this invention to provide a simple gyro that is driven by air turbine means and supported by air bearings.

Another object of this invention is to provide a rotor member and a stator member that have spherical shaped air bearing surfaces.

A further object of this invention is to provide a rotor with a sensing air stream along the axis of rotation thereof.

Still another object of this invention is to provide electrical sensing means that is controlled by the flow of air thereover.

Yet another object of this invention is to provide bolometer sensing elements in a control circuit for the gyro.

In accordance with this invention pneumatically actuated and supported gyros are provided, and in one embodiment, a gyro housing is provided and supported by two gimbals that are in two mutually perpendicular planes. The housing has a spherical chamber therein in which a spherical rotor is rotatably mounted by air bearing means. The rotor is driven by air turbine means, and a portion of the air from the turbine means is exhausted through a passage along the axis of the rotor as a sensing air stream. The sensing air stream impinges on two pairs of temperature-sensitive elements which are themselves parts of bridge circuits that are connected for control of two motors. The cooling effect of the air stream on the temperature-sensitive elements causes an unbalancing of the bridges and in turn causes a signal to be sent to one or both of the motors to correct for the error by adjusting the housing relative to the rotor.

On the accompanying drawing forming a part of this specification, and in which like numerals are employed to designate corresponding parts throughout the same:

Figure 1:
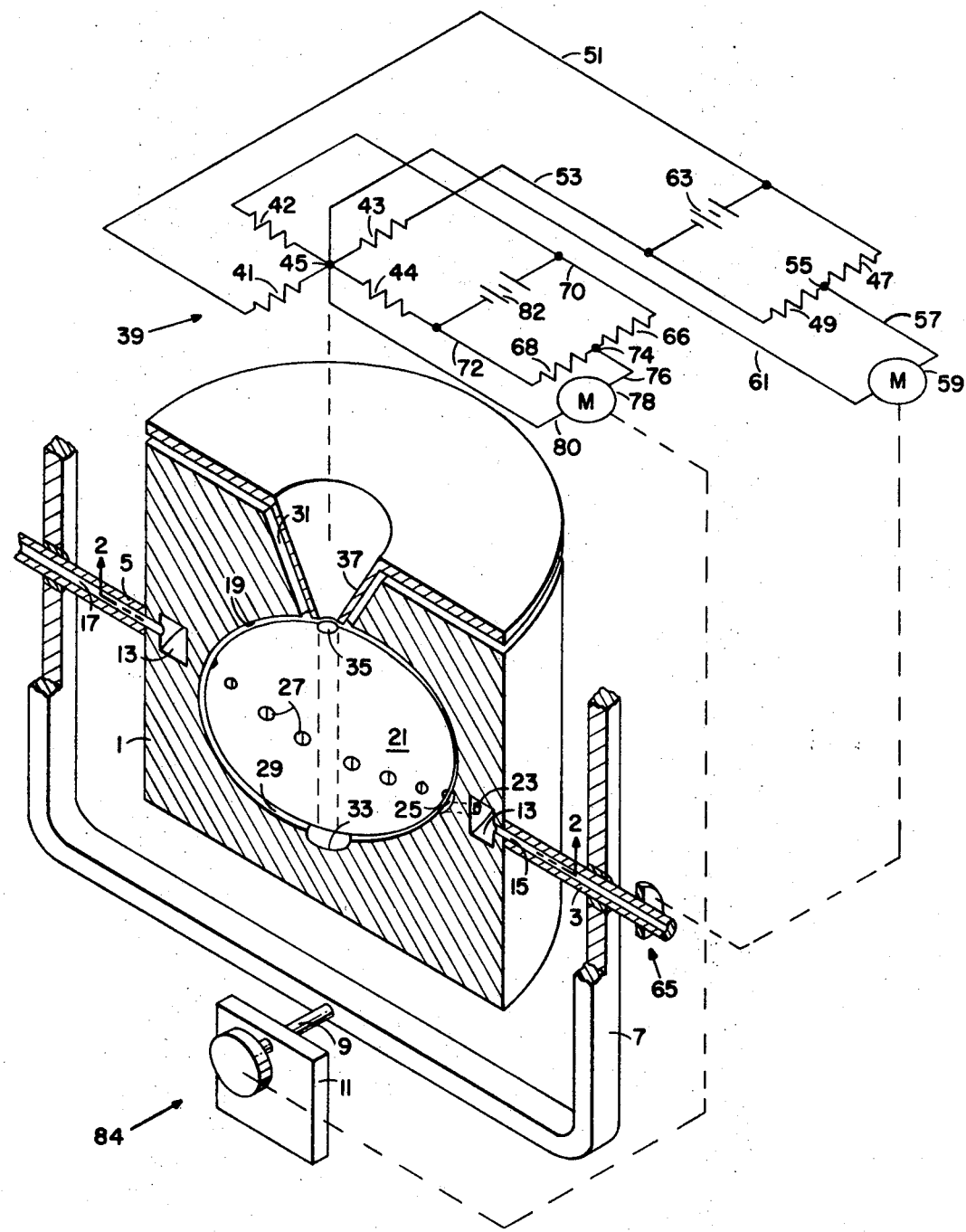
FIG. 1 is an assembly view, partially cut away in section, of an air bearing supported and turbine driven gyro with electrical control means illustrated schematically.
Figure 2:
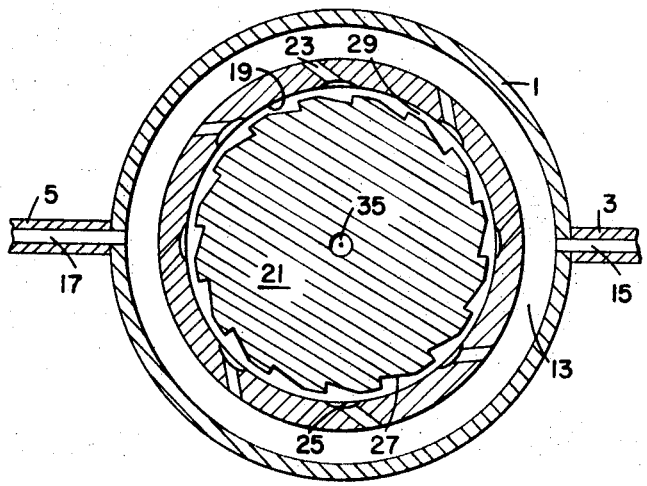
FIG. 2 is a sectional view along line 2-2 of FIG. 1.
Figure 5:
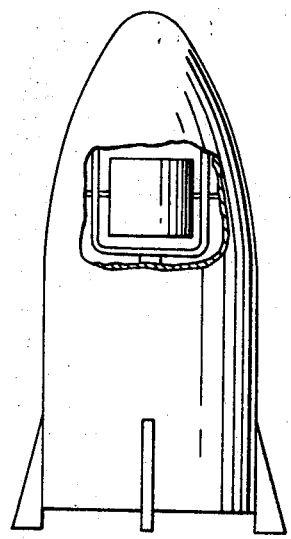
FIG. 5 is a view of a missile, partially cut away and illustrating a gyro therein.

The invention may be better understood by referring to the drawing in which, FIG. 5 shows a missile with a gyro mounted therein in accordance with this invention. Referring more particularly to the structure of the gyro, numeral 1 of FIG. 1 designates a gyro case or housing that forms a stator member for the Gyro. Case 1 is mounted for movement in two degrees of movement by shafts 3 and 5 being rotatably mounted in a conventional manner relative to U-shaped member 7, and by U-shaped member 7 being rotatably mounted near the middle thereof in a conventional manner by shaft 9 relative to fixed support 11.

Case 1 has an annular chamber 13 therein which is communicated with a source of pressure by way of passages 15 and 17 is shafts 3 and 5 respectively. Case 1 also has a substantially spherical chamber 19 therein which houses spherical rotor member 21 for rotation therein.

Fluid pressure from chamber 13 is communicated to chamber 19 through orifices 23 that are inclined about 30° from the perpendicular to the tangent on spherical rotor member 21 at the point of intersection of their centers. The mouth of each of orifices 23 is widened at 25 to provide for an unrestricted flow of air with small deflections of the axis of rotation of the rotor. Rotor member 21 has internal cutouts or buckets 27 therein that receive fluid from orifices 23 to rotate rotor member 21 and provide fluid in air bearing space 29 to support the rotor member. The fluid in air bearing space 29 above buckets 27 is exhausted through exhaust port 31, and the fluid below buckets 27 is communicated to a small cutout depression 33. Passage 35 through rotor member 21 communicates fluid from depression 33 through frustoconical control or exhaust port 37 onto bolometer control means 39. The structure for exhaust port 37 extends inwardly of the spherical surface of chamber 19 and toward rotor member 21 so as to cause substantially all of the fluid above buckets 27 to be exhausted through exhaust port 31 rather than through exhaust port 37.

Bolometer control means 39 includes four bolometer elements 41, 42, 43 and 44 that have one terminal of each connected in common at 45 and are secured in fixed relation in a conventional manner (not shown) relative to case 1 and centered over and perpendicular to the axis of control port 37. Bolometer elements 41 and 43 have the other terminal of each connected to resistors 47 and 49 respectively by leads 51 and 53. The other terminal of each of resistors 47 and 49 is connected at a common point 55 and to lead 57 which is connected to motor means 59. Another lead 61 of motor means 59 is connected to the bolometer elements at 45. A power source 63 is connected across leads 51, 53 to provide power to the bridge circuit formed by bolometer elements 41, 43 and resistors 47, 49.

The output from motor means 59 is mechanically interconnected to shaft 3 by conventional mechanical movement means 65 to adjust case 1 relative to rotor member 21.

Bolometer elements 42 and 44 have the other terminal of each connected to resistors 66 and 68 respectively by leads 70 and 72. The other terminal of each of resistors 66 and 68 is connected at common point 74 and to lead 76 which is connected to motor means 78. Another lead 80 of motor means 78 is connected to the bolometer elements at 45. A power source 82 is connected across leads 70 and 72 to provide power to the bridge circuit formed by bolometer elements 42, 44 and resistors 66, 68.

The output from motor means 78 is mechanically interconnected to shaft 9 by conventional mechanical movement means 84 to adjust case 1 relative to rotor member 21.

In operation, air or fluid is supplied through passages 15 and 17 to chamber 13 and from chamber 13, orifices 23 direct the fluid towards buckets 27. The action of the fluid on buckets 27 causes rotor 21 to rotate in chamber 19 and be brought up to some given rotating speed. The fluid from orifices 23 also fills air space 29 between rotor 21 and case 1 to form air bearing means for the rotor. Some of the excess fluid in air space 29 is communicated to cut out portions 33 and from there through passage 35 and exhaust port 37 onto bolometer elements 41, 42, 43 and 44. As some of bolometer elements 41, 42, 43 and 44 are cooled more than others by the fluid from exhaust port 37 flowing thereover, a signal or signals are sent to motor means 59 and/or motor means 78 to initiate adjustment of case 1 relative to rotor member 21. When bolometer elements 41, 42, 43 and 44 are at the same temperature, no signal will be sent to motor means 59 and 78, and the device will be a steady-state condition.

Figure 3:
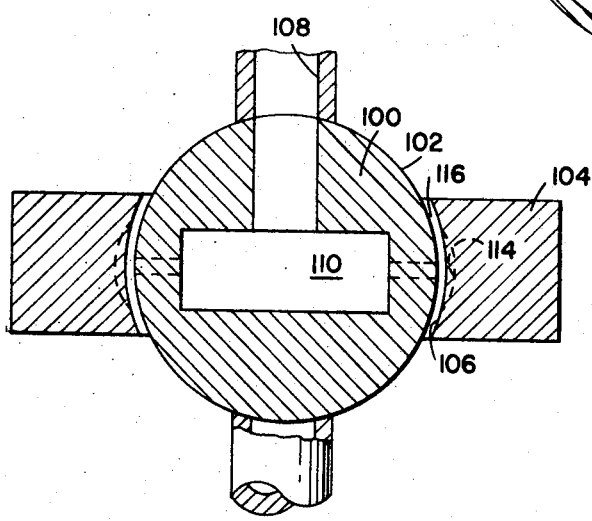
FIG. 3 is a sectional view of another embodiment according to this invention.
Figure 4:
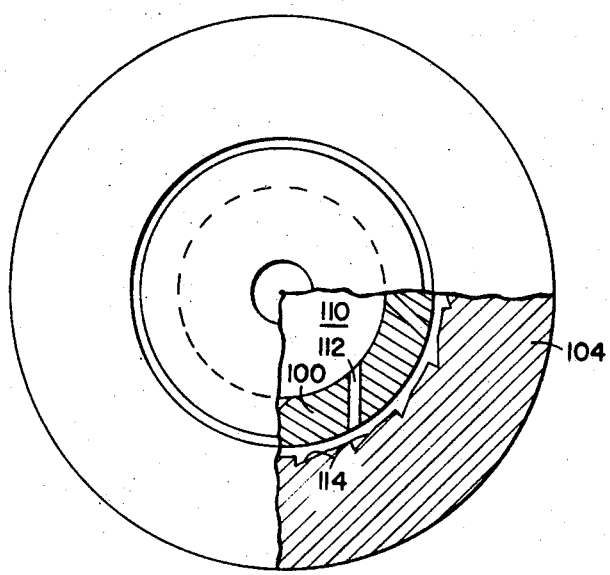
FIG. 4 is a view, partially in section, illustrating turbine structure of the embodiment in FIG. 3.

Referring now to the embodiment disclosed in FIGS. 3 and 4, numeral 100 designated a support stator that has an outer partially spherical surface 102 about which a ring-shaped motor member 104, with a complementary part-spherical surface 106, is adapted to rotate. Stator 100 has a passage 108 which communicates with chamber 110. Angular ports 112 provide communication from chamber 110 to the outer periphery of stator 100, and part-spherical surface 106 of rotor member 104 has a cutout bucket portions 114 to provide a turbine means. Part-spherical surface 106 is spaced sufficiently from a partially spherical surface 102 to define an air bearing space 116 therebetween.

In operation, air is supplied through passage 108 to chamber 110, and from chamber 110 through ports 112 onto the surfaces of buckets 114 to cause rotor member 104 to rotate and be brought up to speed. Air from ports 112 is also distributed to air bearing space 116 and exhausted from air space 116 to the atmosphere. Because of the angular momentum of rotor member 104 and spherical surface 102 and 106 of the air bearing, rotor member 104 remains stabilized in space when the axis of support stator 100 is turned about either of two coordinates vertical to the main axis of support stator 100.

By the use of a conventional mechanical external servosystem, this gyro can be used as a stabilized platform.

It is to be understood that the forms of my invention, herewith shown and described, are to be taken as preferred examples of the same, and that various changes in the size, shape and arrangement of parts may be resorted to, without departing from the spirit of my invention, or the scope of the subjoined claims.

I claim:

1. In a gyro, a rotor member, a stator member, one of said members having a spherical exterior surface, the other of said members having a spherical interior surface spaced from said spherical exterior surface to provide an air bearing space therebetween, cutout bucket portions in the spherical surface of the rotor member, and fluid passage and port means in the stator member for directing fluid at an angle towards said cutout bucket portions to drive the rotor member and provide fluid for the air bearing space, all of said port means being located in a common plane through said stator member and providing the sole means for directing fluid toward said cutout bucket portions and for directing fluid into said air bearing space so as to support said rotor member on a bearing of air.

2. In a gyro as set forth in claim 1, wherein said rotor member is substantially a complete sphere.

3. In a gyro as set forth in claim 1, wherein said stator member has said spherical exterior surface, and said rotor member is ring-shaped.

4. A gyro including: a housing; said housing having a spherical chamber therein; a spherical rotor member rotatably mounted in said chamber; said rotor member having cutout bucket portions in the surface thereof about one great circle; port means in said housing and inclined at an angle toward said cutout bucket portions; fluid passage means in said housing and communicating with said port means to supply fluid to said port means for causing rotation of said rotor member; said housing also having inner and outer concentric control and exhaust ports respectfully on one side of said port means for exhausting fluid from said spherical chamber and a cutout depression on the opposite side of said port means; and said rotor member having a passage opening therethrough for communicating and exhausting fluid from said cutout depression to and through said inner control part.

5. A gyro as set forth in claim 4, wherein bolometer control means are mounted on said housing relative to said inner control port so as to receive control fluid therefrom, said bolometer control means including two bridge circuits that control two motor means, and said motor means are mechanically interconnected to said housing to adjust said housing in two degrees of freedom relative to said rotor member.

6. A gyro as set forth in claim 5, wherein each of said bridge circuits includes two bolometer control elements, each of said bolometer control elements having a terminal thereof connected to one of the terminals of each of the other bolometer control elements, and each of the bolometer control elements being mounted 90° apart and perpendicular to the axis of said inner control port.

7. A gyro including: a stator housing having a chamber therein; a rotor member mounted by air bearing means in said chamber; fluid turbine means for rotating said rotor member relative to said stator housing; a portion of said fluid from said fluid turbine means being exhausted through exhaust port means in said stator housing, and another portion of said fluid from said fluid turbine means being exhausted through a passage extending along a central axis of said rotor member and through a control port in said stator housing so as to allow said passage of said rotor member to be adjusted relative to said control port and control the flow of fluid through said control port, said another portion of said fluid being continuously exhausted and utilized as a fluid flow to an input of a control means; and said control means being interconnected to said stator housing for adjusting said stator housing in two degrees of freedom relative to said rotor member.

8. A gyro as set forth in claim 7, wherein said control port is frustoconical in shape.

9. A gyro as set forth in claim 8, wherein said control means includes bolometer control means mounted relative to said stator housing and said control port so as to receive control fluid from the control port, said bolometer control means including two bridge circuits that control two motor means, said bridge circuits including two bolometer control elements with each of said bolometer control elements having a terminal thereof connected to one of the terminals of each of the other bolometer control elements, and with each of the bolometer control elements mounted 90° apart and perpendicular to the axis of said control port, and wherein said control means is interconnected to said stator housing by said motor means being mechanically interconnected to said stator housing to adjust said stator housing in two degrees of freedom relative to said rotor member.

10. A gyro including: a stator housing having a chamber therein; a rotor member mounted by air bearing means in said chamber; fluid turbine means for rotating said rotor member relative to said stator housing; a portion of said fluid from said fluid turbine means being exhausted through exhaust port means in said stator housing, and another portion of said fluid from said fluid turbine means being exhausted through a control port in said stator housing, said another portion of said fluid being continuously exhausted and utilized as a fluid flow to an input of an control means, said control means including bolometer control means mounted relative to said stator housing and said control port so as to receive control fluid from the control port, said bolometer control means including two bridge circuits that control two motors means; and said control means being interconnected to said stator housing by said motor means being mechanically interconnected to said stator housing to adjust said stator housing in two degrees of freedom relative to said rotor member.